United States Patent [19]

Kasuga et al.

[11] Patent Number: 4,496,626
[45] Date of Patent: Jan. 29, 1985

[54] MAGNETIC RECORDING MEDIUM

[75] Inventors: Akira Kasuga; Noburo Hibino; Hajime Miyatsuka, all of Kanagawa, Japan

[73] Assignee: Fuji Photo Film Co., Ltd., Kanagawa, Japan

[21] Appl. No.: 351,561

[22] Filed: Feb. 23, 1982

[30] Foreign Application Priority Data

Mar. 12, 1981 [JP] Japan .................. 56-35832

[51] Int. Cl.$^3$ .......... G11B 5/74; G11B 5/64; G11B 5/68
[52] U.S. Cl. .................. 428/336; 360/134; 360/135; 360/136; 427/128; 427/132; 428/694; 428/695; 428/480; 428/900
[58] Field of Search ........... 428/900, 694, 695, 336, 428/480; 427/128, 132; 360/134–135

[56] References Cited

U.S. PATENT DOCUMENTS

| 3,967,025 | 6/1976 | Tanube | 428/900 |
| 4,071,654 | 1/1978 | Ogawa et al. | 428/336 |
| 4,153,920 | 5/1979 | Shirahata | 428/900 |
| 4,202,927 | 5/1980 | Yamaguchi | 428/323 |
| 4,348,446 | 9/1982 | Mitsuishi | 428/694 |
| 4,461,797 | 7/1984 | Adachi | 428/480 |

FOREIGN PATENT DOCUMENTS 54-143111  11/1979  Japan .................. 427/131

Primary Examiner—Ellis P. Robinson
Attorney, Agent, or Firm—Sughrue, Mion, Zinn, Macpeak & Seas

[57] ABSTRACT

A magnetic recording medium for high-density recording, which comprises a non-magnetic substrate and a magnetic layer provided on the non-magnetic substrate and containing, as main constituents, ferromagnetic grains and a binder, wherein the non-magnetic substrate surface on the side adjoining the magnetic layer has a surface roughness higher than that of the back surface of the non-magnetic substrate. The substrate surface adjoining the magnetic layer has a surface roughness of $0.007\mu$ or more, while the back surface has a surface roughness of $0.02\mu$ or less, but in each particular application the roughness of the surface adjoining the magnetic layer is selected to be higher than that of the back surface.

9 Claims, 1 Drawing Figure

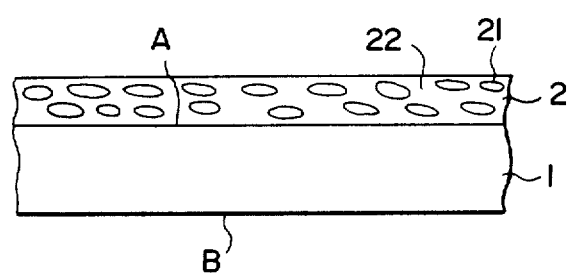

MAGNETIC RECORDING MEDIUM

BACKGROUND OF THE INVENTION

1. Field of the Invention

This invention relates to a magnetic recording medium for high-density recording, and more particularly to an improvement of a substrate of a magnetic recording medium used for high-density video recording or the like.

2. Description of the Prior Art

A magnetic recording medium generally comprises a non-magnetic substrate such as polyethylene terephthalate film, polycarbonate film or polyimide film, and a magnetic layer which is provided on the non-magnetic substrate and which consists mainly of ferromagnetic particles and a binder.

In the past, oxide-based fine grains were used as the ferromagnetic grains. Recently, ferromagnetic metal particles are adopted to improve the magnetic recording density and the reproduction output because of their high saturation magnetization and high coercive force.

For the purpose of high-density recording, the magnetic layer must have high surface smoothness to reduce the space loss of electromagnetic transducing characteristics due to the space between a magnetic head and the magnetic tape. Accordingly, it is desired to improve surface smoothness of the magnetic layer by improving the techniques of making the magnetic layer, that is, the dispersing, coating and surface forming techniques for magnetic materials. Further, surface smoothness of the substrate itself is also an important factor for minimizing the space loss because it affects that of the magnetic layer. Particularly, when shorter recording wavelengths are used to improve the recording density, it is advantageous to reduce the thickness of the magnetic layer so as to minimize the influence of the thickness loss. When the thickness of the magnetic layer is reduced, surface smoothness thereof is affected to a larger extent by the surface smoothness of the substrate.

Generally, a plastic film is used as the substrate for the magnetic recording medium. However, surface smoothness of the plastic film can be improved only to a limited extent for the reasons described below.

Namely, if the film formed from a plastic material has good surface smoothness, the frictional resistance between the film and the rollers carrying the film increases, and the film creases or zigzags when it is formed and wound up into a film roll form. Further, the frictional resistance between the film surfaces themselves also increases, so that the film cannot be rolled into the desired cylindrical form but is rolled into a distorted form. Particularly when the tape has a thickness of 25μ or less, it is difficult to satisfactorily wind up the tape. In the past this problem has been eliminated by making one or both surfaces of the tape rough. Such a problem arises not only in the manufacture of the plastic film but also in the process for making a magnetic tape by applying a magnetic layer on the plastic film.

In view of the above circumstances, various methods have been proposed to decrease the frictional resistance of a plastic film so as to facilitate the relative movement thereof. For example, it has been proposed in Japanese patent publication No. 43(1968)-23888 to mat the film surfaces by adding a filler to a plastic material used for forming the film. It has also been proposed in Japanese patent publication No. 47(1972)-39929 to mechanically form an uneven film surface by use of a casting drum or the like. An attempt has also been made to decrease the friction coefficient of the film surface by applying a crosslinkable silicone resin onto the film surface as disclosed in Japanese unexamined patent publication No. 52(1977)-18770. In another method, only one surface of a film is matted by extruding a raw plastic material containing a filler. The most popular raw material for plastic films is polyethylene terephthalate (PET).

The above-mentioned problems concerning the film substrate make it impossible to sufficiently improve surface smoothness of a magnetic layer to achieve high-density recording. Accordingly, it has been a general practice to apply a magnetic layer on the side of a film substrate having the latter surface smoothness.

SUMMARY OF THE INVENTION

The primary object of the present invention is to provide a magnetic recording medium having excellent magnetic characteristics.

Another object of the present invention is to provide a magnetic recording medium exhibiting excellent video characteristics.

A further object of the present invention is to provide a magnetic video recording medium exhibiting a high signal-to-noise ratio.

The specific object of the present invention is to provide a so-called metal tape exhibiting excellent video characteristics.

The above objects are accomplished by making a magnetic recording medium in such a way that the surface roughness of the surface of a non-magnetic substrate on the side adjoining the magnetic layer applied thereon (surface A in the accompanying figure described later) is higher than that of the back surface of the non-magnetic substrate(surface B).

In the present invention, the non-magnetic substrate may be made of, for example, a polyester such as polyethylene terephthalate or polyethylene-2,6-naphthalate; a polyolefin such as polyethylene or polypropyrene; a cellulose derivative such as cellulose triacetate, cellulose diacetate, cellulose acetate butyrate, or cellulose acetate propionate; a vinyl resin such as polyvinyl chloride or polyvinylidene chloride; or a plastic such as polycarbonate, polyimide, or polyamide imide. According to the intended application, it is also possible to use a non-magnetic metal such as aluminium, copper, tin, zinc, or a non-magnetic alloy or stainless steel containing at least one of these metals; paper, baryta paper, or paper coated or laminated with an α-polyolefin having 2 to 10 carbon atoms such as polyethylene, polypropylene or ethylene-butene copolymer. The non-magnetic substrates made of these materials may be transparent or opaque depending on the purpose of their use.

The non-magnetic substrate used in accordance with the present invention may be in the form of a tape, sheet or the like, and various materials may be selected therefor according to the form thereof. The most popular way is to use a plastic film in the form of a tape as the substrate, which way is effective also for the purpose of the present invention.

The term "surface roughness" as used herein means the arithmetical mean deviation defined in Item 5 of JIS B 0601, with the cut-off value being 0.25 mm.

In accordance with the present invention, a magnetic layer is provided on the side of the non-magnetic substrate, which has a surface roughness higher than that of the other side thereof. From the standpoint of the electromagnetic transducing characteristics of the magnetic tape, it is preferred that the surface roughness of the substrate be as low as possible. For other reasons, however, the surface roughness of the substrate should not be too low, particularly in the case of a plastic film. Namely, if the surface roughness thereof is too low, problems arise with regard to the process of making the film and the magnetic tape, and the movement of the magnetic tape in a video tape recorder or a cassette deck. Accordingly, at least one side of the substrate should have a surface roughness of a certain level or more. In the present invention, it is preferred that at least one side of the non-magnetic substrate has a surface roughness of $0.007\mu$ or more.

The substrate used in the present invention may be of any thickness and width. It should be noted, however, that various problems arising as surface smoothness of the substrate is improved are exacerbated when the thickness thereof falls to $15\mu$ or less.

The material of the substrate is selected taking the mechanical characteristics, thermal stability, moisture resistance or the like into consideration. One of the most popular materials is polyethylene terephthalate, which provides useful effects also in the present invention.

In the case of a plastic film, the process for making the substrate generally comprises the steps for drying plastic pellets, melting them, extruding the melt onto a metallic drum, drawing the formed film longitudinally and transversely, thermally fixing the film, and winding up the finished film.

If the film has too high surface smoothness, it creases, zigzags and forms a film roll of an inadequate shape due to its large frictional resistance with respect to the carrying rollers and between film surfaces when it is wound up into a film roll form. Therefore, to avoid this problem, various methods have been proposed to facilitate the relative movement of the plastic film as described above. Among these, the most effective and practical method is to control the surface roughness of the film by adding a filler to the raw film material or by mechanically making the film surface uneven. These methods are aimed at alleviating the aforesaid problem by increasing the surface roughness on at least one side of the film.

In the conventional methods, it has been a general practice to make the surface roughness of the substrate surface adjoining the magnetic layer (surface A) smaller than that of the other substrate surface (surface B). This was based on the presumption that the surface A would have a larger influence on the surface roughness of the magnetic layer applied thereon than would the surface B, and that it would be advantageous to increase the surface roughness of the surface B to some extent so as to satisfactorily move the tape having a high signal-to-noise ratio in a video tape recorder.

On the contrary, however, studies made by the inventors on various magnetic recording tapes revealed that the tape characteristics, particularly the electromagnetic transducing characteristics such as output and signal-to-noise ratio, are effected to a larger extent by the surface roughness of the surface B than by that of the surface A. Further, it has been found that this tendency increases particularly in the case of a metal tape, in which the ferromagnetic grains in the magnetic layer are metals.

In the present invention, the surface A has a surface roughness of $0.007\mu$ or more, preferably $0.008\mu$ or more, particularly $0.01\mu$ or more. The surface B has a surface roughness of $0.02\mu$ or less, preferably $0.016\mu$ or less, particularly $0.013\mu$ or less. But it should be noted that in each particular application, the surface roughness of the surface A is selected to be higher than the surface roughness of the surface B.

BRIEF DESCRIPTION OF THE DRAWING

The FIGURE is a sectional view showing the basic configuration of the magnetic recording medium in accordance with the present invention.

DESCRIPTION OF PREFERRED EMBODIMENTS

The present invention will hereinbelow be described in further detail with reference to the accompanying drawing.

The FIGURE shows the basic configuration of the magnetic recording medium in accordance with the present invention, which comprises a non-magnetic substrate 1 and a magnetic layer 2 provided thereon. The surface A of the non-magnetic substrate 1, which adjoins the magnetic layer 2, has a surface roughness higher than that of the back surface B of the substrate 1. The magnetic layer 2 contains ferromagnetic grains 21 and a binder 22 as the main constituents. The ferromagnetic grains 21 used in accordance with the present invention are oxide magnetic materials such as $\gamma$-$Fe_2O_3$, $Fe_3O_4$ and $CrO_2$, metal or alloy magnetic materials such as Fe, Co and Ni, or a mixture of two or more of these materials.

Typical oxide magnetic materials are iron oxide and ohromium dioxide ($CrO_2$). The iron oxide material may be $\gamma$-$Fe_2O_3$ (maghemite), $Fe_3O_4$ (magnetite) or the like, and is generally prepared by the gesite process in which a ferrous oxide solution is treated with an alkali to form iron hydroxide, the formed iron hydroxide is then oxidized and dehydrated to form acicular $\alpha$-FeOOH (gesite) to be used as the starting material for forming the iron oxide grains. This process yields iron oxide grains exhibiting good characteristics. The grain size is within the range of 0.3 to 2 , the acicular ratio is within the range of 5/1 to 10/1, and the coercive force (Hc) is 200 to 500 oersted(Oe). The iron oxide grains may further be doped with Co to increase the coercive force. In this case, Co is distributed in the vicinity of the surfaces of the iron oxide grains to alleviate the problems of demagnetization with heat and pressure and to obtain grains exhibiting satisfactory characteristics and a coercive force of 500 oersted or more. The $CrO_2$ grains are obtained in the form of fine acicular grains by the hydrothermal reaction. The $CrO_2$ grains exhibit the same level of coercive force as the Co-containing iron oxide and good properties such as wetting property with binders, although they are not completely satisfactory with respect to demagnetization with heat.

The term "ferromagnetic metal grains" as used herein means fine grains of metals of alloys exhibiting ferromagnetism. They essentially consist of at least about 75 wt. %, preferably at least 80 wt. %, of metal contents, and at most about 25 wt. %, preferably at most 20 wt. %, particularly from 1 to 15 wt. %, of hydrogen or oxygen in the form of water, hydroxide or oxide. Of the metal contents, the ferromagnetic metal or metals exist in the proportion of about 80 wt. % or more, preferably from 85 to 100 wt. %. The ferromagnetic metal or metals should at least contain Fe, namely, should be Fe metal, or Fe-Co, Fe-Ni, Fe-Co-Ni alloys or the like. The ferromagnetic metal generally comprises about 50 wt.

% or more, preferably from 70 to 100 wt. %, of Fe and about 50 wt. % or less, preferably from 0 to 30 wt. % of Co, Ni or Co-Ni. The aforesaid metal contents may also include a non-magnetic metal in an amount of about 10 wt. % or less, preferably from 0.05 to 5 wt. %, or a non-metallic element in a proportion of about 0.1 to 10 wt. %, preferably from 0.1 to 5 wt. %, or both of these non-magnetic metal and element. Examples of these non-magnetic metals and elements are B, C, N, Al, Si, P, S, Ti, Cr, Mn, Cu, Zn, Mo, Pd, Ag, Sn, Sb, Ba, La, Ce, Sm, W, and Pb and the like. Two or more of these non-magnetic metals and elements may be contained in the metal at the same time.

The ferromagnetic metal grains used in the present invention may be prepared by any of the following known processes:

(1) Decomposing an organic acid salt of the ferromagnetic metal under heat, and reducing the decomposed product with a reducing gas.
(2) Reducing an acicular oxyhydroxide, which may or may not contain another metal, or an acicular iron oxide obtained from such an oxyhydroxide.
(3) Evaporating the ferromagnetic metal in an inert gas at a low pressure.
(4) Thermally decomposing a metal carbonyl compound.
(5) Electrodepositing the ferromagnetic metal particles by use of a mercury cathode, and separating the particles from mercury.
(6) Reducing an aqueous solution of a salt of a metal capable of forming a ferromagnetic material by use of a reducing material such as boron hydride compound, hypophosphite, hydrazine or the like, to obtain the ferromagnetic grains.

Further, to stabilize the formed fine metal grains, the surfaces thereof are generally oxidized. In this connection, it has been found that ferromagnetic grains containing 5% or more of oxygen, as measured with atomic-absorption spectroscopy, are particularly effective for the present invention.

As for the particle size of the ferromagnetic metal grains used in the present invention, there are used chainlike grains generally having a short axis length of 500Å or less, preferably from 150Å to 400Å, and an axial ratio (i.e. the ratio of the length of the necklace-like grain chain to that of the grains) of 3 or more, preferably from 5 to 20. Acicular ferromagnetic metal grains generally have a length within the range of $0.1\mu$ to $2\mu$ and an acicular ratio within the range of 5/1 to 10/1. As for the magnetic characteristics, these grains exhibit a saturation magnetization ($\sigma s$) of about 100 to 190 emu/g (as measured at Hm=10 kOe), and a coercive force (Hc) of about 800 Oe or more, preferably form 900 to 2500 Oe.

In accordance with the present invention, particularly high effects are obtained when the ferromagnetic grains are metal or alloy fine grains.

The ferromagnetic grains used in the present invention may be mixed with a binder to form a magnetic coating material.

The binder used in the present invention may be a conventional thermoplastic resin, a thermosetting resin, or a reactive resin, or a mixture of two or more of these resins.

The thermoplastic resin used as the binder in the present invention generally has a softening point of 150° C. or lower, an average molecular weight within the range of 10,000 to 200,000, and a polymerization degree within the range of about 100 to 1000. The thermoplastic resin may, for example, be a vinyl chloride-vinyl acetate copolymer, a vinyl chloride-vinylidene chloride copolymer, a vinyl chlorideacrylonitrile copolymer, an acrylic ester-acrylonitrile copolymer, an acrylic ester-vinylidene chloride copolymer, an acrylic ester-styrene copolymer, a methacrylic esteracrylonitrile copolymer, a methacrylic ester-vinylidene chloride copolymer, a methacrylic ester-styrene copolymer, a urethane elastomer, a polyvinyl fluoride, a vinylidene chloride-acrylonitrile copolymer, a butadiene-acrylonitrile copolymer, a polyamide resin, a polyvinyl butyral, a cellulose derivative (such as cellulose acetate butyrate, cellulose diacetate, cellulose triacetate, cellulose propionate, or nitrocellulose), a styrenebutadiene copolymer, a polyester resin, a synthetic rubber type thermoplastic resin (such as polybutadiene, polychloroprene, polyisoprene, or styrene-butadiene copolymer), or a mixture of two or more of these compounds.

The thermosetting resin or the reactive resin which may be used as the binder in the present invention generally has a molecular weight of 200,000 or less when in the form of coating solution, and exhibits an infinite increase in molecular weight through condensation or addition reaction or the like when applied onto the substrate and dried. It is preferable that the resin of this type should not soften or melt before the thermal decomposition. Examples of the resin of this type are a phenol formaldehyde-novolak resin, a phenol formaldehyde-resol resin, a phenol furfural resin, a xylene formaldehyde resin, a urea resin, a melamine resin, a drying oil alkyd resin, an alkyd resin modified with phenolic resin, an alkyd resin modified with maleic resin, an unsaturated polyester resin, a combination of an epoxy resin with a hardener (e.g. polyamine, acid anhydride, polyamide resin or the like), a moisture hardening type terminal isocyanate polyester resin, a moisture hardening type terminal isocyanate polyether resin, a polyisocyanate prepolymer (e.g. a compound having three or more isocyanate groups in a molecule and obtained by the reaction of diisocyanate and low molecular weight triol, a trimer or a tetramer of diisocyanate, or the like), a resin containing a polyisocyanate prepolymer and an active hydrogen (e.g. polyester polyol, polyether polyol, acrylic copolymer, maleic copolymer, 2-hydroxyethyl methacrylate copolymer, para-hydroxy styrene copolymer or the like), and mistures of two or more of these compounds.

The magnetic coating composition may further contain a lubricant and an abrasive material. If necessary, a dispersing agent, an antistatic agent and a corrosion preventing agent may further be added to the coating composition. The obtained coating composition is applied onto a non-magnetic substrate to form the magnetic recording medium in accordance with the present invention.

The aforesaid magnetic coating composition may be prepared according to known procedures as described, for example, in Japanese patent publication Nos. 48(1973)-11162, 48(1973)-21331, and 48(1973)-33683, and U.S. Pat. Nos. 3,240,621, 3,526,598, 3,728,262, 3,790,407 and 3,836,393.

The binder is generally mixed with the ferromagnetic grains at a ratio of within the range of 8 to 25 parts by weight per 100 parts by weight of ferromagnetic grains. The magnetic layer has a thickness within the range of $0.5\mu$ to $6\mu$ in the dry state.

Examples of lubricants which may be used in the magnetic coating composition are a silicone oil such as polysiloxane, inorganic fine grains such as graphite, and molybdenum disulfide, plastic fine grains such as polyethylene and polytetrafluoroethylene, long-chain fatty acids, fatty acid esters, and fluorocarbons. The lubricant is used at a ratio within the range of 0.2 to 20 parts by weight per 100 parts by weight of the binder.

The abrasive material may be fine grains of fused alumina, silicone carbide, chromium oxide ($Cr_2O_3$), corundum, diamond or the like having an average grain size within the range of $0.05\mu$ to $5\mu$. The abrasive material is used at a ratio within the range of 0.5 to 20 parts by weight per 100 parts by weight of the binder.

The aforesaid magnetic coating composition is made uniform by use of an organic solvent, for example, a ketone such as methyl ethyl ketone or cyclohexanone, an alcohol, an ester such as ethyl acetate or butyl acetate, an aromatic solvent such as benzene, toluene or xylene, or a chlorinated hydrocarbon solvent such as carbon tetrachloride or chloroform. The thus prepared coating composition is then applied onto the non-magnetic substrate.

The magnetic layer applied onto the substrate is orientated and dried, and may further be subjected to a smoothing treatment (e.g. smoothing treatment before drying, or calendering after drying) for the purpose of improving magnetic characteristics such as signal-to-noise ratio.

In the present invention, it is also possible to apply a prime coating layer on the surface A of the substrate for the purpose of improving the adhesion between the magnetic layer and the substrate, or to apply a matted layer, a lubricant layer or a combination of these layers on the surface B of the substrate so as to improve the movement characteristics of the magnetic recording medium.

The present invention is advantageous in that it provides a magnetic recording medium exhibiting a high signal-to-noise ratio. The reason why such a high signal-to-noise ratio can be exhibited has not yet been fully determined. However, it is presumed that, because the surface B has a good surface roughness, the unevenness of the surface is transferred to the surface of the magnetic layer while the plastic film or the like coated with the magnetic layer is stored in a roll form. Contact between the substrate surface having a lower surface roughness and the magnetic layer, which is established in accordance with the present invention, is considered effective to decrease the noise and increase the signal-to-noise ratio.

Experiments conducted by the inventors revealed that the aforesaid effect of the present invention is particularly remarkable when the ferromagnetic grains are metal or alloy fine grains.

As described above, the studies conducted by the inventors revealed that the surface roughness of the surface B of the substrate has a greater influence on the signal-to-noise ratio than the surface A. This observation is very surprising because, in the past, it was considered that the surface A has a higher influence on the signal-to-noise ratio than the surface B, and it was a general practice to attach importance to the surface roughness of the surface A.

The present invention is practically advantageous in that at least one surface of the substrate may have a surface roughness of a level which does not present a problem with regard to the process of making the substrate.

The magnetic tape of the present invention may also be provided with another back layer on the surface B for the purpose of improving the movement characteristics of the tape.

The present invention will further be illustrated by the following nonlimitative examples, wherein parts represent parts by weight unless otherwise specified.

EXAMPLE 1

Acicular $\alpha$-FeOOH containing 5 wt. % of cobalt was thermally decomposed to form $\alpha$-$Fe_2O_3$, which was then reduced with hydrogen to prepare black ferromagnetic metal grains. Before ejecting the metal grains from the furnace, the oxygen partial pressure in the furnace was gradually increased to gradually oxidize the metal grains. The thus prepared metal grains exhibited a coercive force (Hc) of 1100 Oe, a saturation magnetization ($\sigma$s) of 114 emu/g, and a squareness ratio (Br/Bm) of 0.44.

Then, 300 parts of the ferromagnetic metal grains prepared as described above were mixed with and dispersed in the following composition in a ball mill for 10 hours:

| | |
|---|---|
| Polyester polyurethane (a reaction product of ethylene adipate and 2,4-tolylene diisocyanate, having a styrene-equivalent average molecular weight of about 130,000) | 35 parts |
| Vinyl chloride-vinyl acetate-maleic anhydride copolymer (maleic acid contents: 3.0 wt. %, polymerization degree: about 400) | 30 parts |
| Dimethylpolysiloxane (polymerization degree: about 60) | 2 parts |
| Butyl acetate | 300 parts |
| Methyl isobutyl ketone | 300 parts |

After dispersion, 22 parts of a 75 wt. % ethyl acetate solution of a triisocyanate compound (Desmodule L-75 available from Bayer A.G., which is an addition product obtained from 3 mols of tolylene diisocyanate and 1 mol of trimethylolpropane, and has a molecular weight of about 760, and an NCO content of 13.3 wt. %) were added, and the resulting mixture was shear-dispersed at a high speed for one hour to prepare a magnetic coating composition. On the other hand, a polyethylene terephthalate film having a thickness of $14.5\mu$, and a surface roughness of $0.020\mu$ on one side and $0.010\mu$ on the other side, was used as the substrate. The magnetic coating composition prepared as described above was then applied onto the surface of the polyethylene terephthalate film which had a surface roughness of $0.020\mu$, so as to obtain a magnetic layer thickness of $4.0\mu$ in dry state. Thereafter, the magnetic coating layer was orientated in a direct current magnetic field, and dried with hot air at a temperature of 100° C. After drying, the formed film was calendered and slitted to a ½ inch width to obtain a video magnetic tape. The final thickness of the magnetic coating layer was $3.4\mu$.

The magnetic characteristics of the thus obtained video magnetic tape were measured with a vibration specimen type magnetic flux gauge (Model VSM-III available from Toei Kogyo K. K. of Japan).

As for the video characteristics, the 4 MHz reproduction output was measured by use of a VHS system video tape recorder having a recording and reproducing head modified to the Sendust alloy (Model NV-8800 available from Matsushita Electric Industrial Co., Ltd. of Japan).

COMPARATIVE EXAMPLE 1

A video magnetic tape was made in the same manner as described in Example 1, except that the magnetic coating composition was applied onto the substrate surface having a surface roughness of $0.010\mu$.

The video tapes obtained in Example 1 and Comparative Example 1 exhibited the following magnetic characteristics and video characteristics:

|  | Magnetic characteristics | | | video* sensi- tivity | C/N* | |
|---|---|---|---|---|---|---|
|  | Hc | Bm | Br/Bm |  | at 3 MHz | at 3.5 MHz |
| Example 1 | 1050 | 3350 | 0.78 | +1.5 dB | +0.5 dB | +2.0 dB |
| Comparative Example 1 | 1050 | 3300 | 0.77 | 0 dB | 0 dB | 0 dB |

*Video sensitivity: Reproduction output at 4 MHz.
*C/N: Ratio of reproduced wave carrier to noise when a 4 MHz carrier was recored (this ratio corresponds to the signal-to-noise ratio).

The above table clearly shows that the video tape of Example 1 according to the present invention exhibits better video characteristics than that of Comparative Example 1.

EXAMPLE 2, COMPARATIVE EXAMPLE 2

Video magnetic tapes were made in the same manners as described in Example 1 and Comparative Example 1, respectively, except that the magnetic fine grains were replaced by Co-doped type iron oxide (Berridox ®) as the ferromagnetic grains. The thickness of the magnetic coating layer was $4.1\mu$ before calendering and $3.2\mu$ after calendering. The results were as set forth below.

|  | Magnetic characteristics | | | video sensi- tivity | C/N | |
|---|---|---|---|---|---|---|
|  | Hc | Bm | Br/Bm |  | at 3 MHz | at 3.5 MHz |
| Example 2 | 650 | 1350 | 0.81 | +0.5 dB | 0.9 dB | 1.2 dB |
| Comparative Example 2 | 650 | 1280 | 0.80 | 0 dB | 0 dB | 0 dB |

EXAMPLE 3, COMPARATIVE EXAMPLE 3

Video magnetic tapes were made in the same ways as described in Example 1 and Comparative Example 1, respectively, except that the magnetic fine grains used as the ferromagnetic grains were replaced by the metal fine grains prepared by evaporating and depositing a solid solution (Fe/Co=70/30) in a low pressure argon gas (Hc=1450 Oe, $\sigma$s=140 emu/g).

The video tape in accordance with the present invention exhibited video characteristics improved +1 to +2 dB over the conventional tape.

EXAMPLE 4, COMPARATIVE EXAMPLE 4

The procedures of Example 1 and Comparative Example 1 were followed, except that polyethylene terephthalate films having a surface roughness of $0.014\mu$ on one side and $0.007\mu$ on the other side were used as the substrates. In Example 4, the magnetic layer was applied onto the substrate surface having a surface roughness of $0.014\mu$. In Comparative Example 4, it was applied onto the substrate surface having a surface roughness of $0.007\mu$.

These experiments confirmed that the video tape of the present invention exhibited video characteristics improved +0.5 to +2.0 dB over the conventional tape.

EXAMPLE 5, COMPARATIVE EXAMPLE 5

The procedures of Example 1 and Comparative Example 1 were followed, except that nitrocellulose (RS ½) was used instead of the vinyl chloride-vinyl acetate copolymer. It was confirmed that the video tape made in accordance with the present invention exhibited improved video characteristics.

In the present invention, the flatness on both sides of the substrate may be adjusted in any way. For example, it may be adjusted when making a film from the polyethylene terephthalate base, or may be adjusted by a secondary matting or coating treatment.

We claim:

1. A magnetic recording medium which comprises a non-magnetic substrate and a magnetic layer provided on said non-magnetic substrate and containing, as main constituents, ferromagnetic grains and a binder, wherein the surface roughness of the non-magnetic substrate surface on the side adjoining said magnetic layer is $0.007\mu$ or more and is higher than the surface roughness of the back surface of said non-magnetic substrate which is $0.02\mu$ or less.

2. A magnetic recording medium as defined in claim 1 wherein said ferromagnetic grains are metal or alloy fine grains, and said non-magnetic substrate is a plastic film.

3. A magnetic recording medium as defined in claim 1 wherein said ferromagnetic grains essentially consist of about 75 wt. % or more of metal content, and about 25 wt. % or less of hydrogen or oxygen in the form of water, hydroxide or oxide.

4. A magnetic recording medium as defined in claim 3 wherein said metal content includes about 80 wt. % or more of at least one ferromagnetic metal.

5. A magnetic recording medium as defined in claim 4 wherein said at least one ferromagnetic metal essentially consists of about 50 wt. % or more of Fe, and about 50 wt. % or less of Co, Ni or Co-Ni.

6. A magnetic recording medium as defined in claim 1 wherein the surfaces of said ferromagnetic grains are oxidized to obtain an oxygen content of 5% or more.

7. A magnetic recording medium as defined in claim 1 wherein said binder is a thermoplastic resin, a thermosetting resin, a reactive resin, or a mixture of two or more of these resins.

8. A magnetic recording medium as defined in claim 1 wherein said magnetic layer contains a binder in a proportion within the range of 8 to 25 parts by weight per 100 parts by weight of said ferromagnetic grains.

9. A magnetic recording medium as defined in claim 1 wherein said magnetic layer has a thickness within the range of $0.5\mu$ to $6\mu$ in dry state.

* * * * *